US010595199B2

(12) United States Patent
Tg et al.

(10) Patent No.: US 10,595,199 B2
(45) Date of Patent: Mar. 17, 2020

(54) TRIGGERING USER AUTHENTICATION IN COMMUNICATION NETWORKS

(71) Applicant: Alcatel Lucent, Boulogne Billancourt (FR)

(72) Inventors: Priya Tg, Bangalore (IN); Ranjan Ghosh, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 47 days.

(21) Appl. No.: 14/422,895

(22) PCT Filed: Aug. 23, 2013

(86) PCT No.: PCT/EP2013/067583
§ 371 (c)(1),
(2) Date: Feb. 20, 2015

(87) PCT Pub. No.: WO2014/044491
PCT Pub. Date: Mar. 27, 2014

(65) Prior Publication Data
US 2015/0237499 A1    Aug. 20, 2015

(30) Foreign Application Priority Data
Sep. 24, 2012  (IN) .......................... 2971/DEL/2012

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0892* (2013.01); *H04L 63/108* (2013.01);
(Continued)

(58) Field of Classification Search
CPC ............ H04W 4/26; H04W 12/00–02; H04W 12/06–08; H04W 12/12;
(Continued)

(56) References Cited

U.S. PATENT DOCUMENTS 8,180,333 B1    5/2012 Wells et al.
2003/0186681 A1    10/2003 Gabor
(Continued)

FOREIGN PATENT DOCUMENTS

CN    1482549    3/2004
CN    1826766    8/2006
(Continued)

OTHER PUBLICATIONS

Daciuk et al. "Smaller representation of finite state automata". Theoretical Computer Science. doi:10.1016/j.tcs.2012.04.023. Published: Oct. 21, 2012. (Year: 2012).*

*Primary Examiner* — Kevin Bechtel
(74) *Attorney, Agent, or Firm* — McCracken & Gillen LLC

(57) ABSTRACT

The present subject matter discloses a method for triggering re-authentication of a communication device connected to a communication network. In one implementation, a volume of data transferred between the communication device and the communication network is measured. Further, the volume of data measured is compared with a re-authentication threshold value. Subsequently re-authentication of the communication device is triggered based on the comparison.

19 Claims, 2 Drawing Sheets

(51) Int. Cl.
*H04W 12/12* (2009.01)
*H04W 12/08* (2009.01)

(52) U.S. Cl.
CPC ....... *H04W 12/08* (2013.01); *H04W 12/0802* (2019.01); *H04W 12/1206* (2019.01); *H04L 63/1425* (2013.01)

(58) Field of Classification Search
CPC . H04W 48/00–16; H04L 63/0884–101; H04L 63/108; H04L 63/20
See application file for complete search history.

(56) References Cited

U.S. PATENT DOCUMENTS

| | | | | |
|---|---|---|---|---|
| 2004/0168101 | A1* | 8/2004 | Kubo | G06F 11/108 714/6.12 |
| 2006/0007897 | A1* | 1/2006 | Ishii | H04L 12/2856 370/338 |
| 2007/0008937 | A1 | 1/2007 | Mody et al. | |
| 2007/0143552 | A1 | 6/2007 | Rastogi et al. | |
| 2008/0220740 | A1 | 9/2008 | Shatzkamer et al. | |
| 2010/0058148 | A1* | 3/2010 | Lu | H04L 41/5009 714/776 |
| 2010/0296487 | A1 | 11/2010 | Karaoguz et al. | |
| 2011/0072488 | A1* | 3/2011 | Bi | H04L 63/108 726/1 |
| 2011/0149736 | A1* | 6/2011 | Kashyap | H04L 41/0893 370/235 |
| 2011/0153495 | A1* | 6/2011 | Dixon | G06Q 20/10 705/39 |
| 2011/0162060 | A1* | 6/2011 | Vijayakumar | H04L 12/413 726/13 |
| 2011/0173480 | A1* | 7/2011 | Bloomfield | G06F 1/14 713/500 |
| 2013/0148668 | A1* | 6/2013 | Kean | H04L 12/1435 370/401 |
| 2013/0167211 | A1* | 6/2013 | Kamat | H04L 63/20 726/7 |

FOREIGN PATENT DOCUMENTS

| | | |
|---|---|---|
| CN | 101527671 | 9/2009 |
| CN | 101662768 | 3/2010 |
| CN | 102447702 | 5/2012 |
| JP | 200216633 | 1/2002 |
| JP | 2004343448 | 12/2004 |
| JP | 2005522122 | 7/2005 |
| JP | 2006529062 | 12/2006 |
| JP | 2009518896 | 5/2009 |
| JP | 2011142385 | 7/2011 |
| WO | 2008/126507 | 10/2008 |

* cited by examiner

TRIGGERING USER AUTHENTICATION IN COMMUNICATION NETWORKS

FIELD OF INVENTION

The present subject matter relates to authentication in communication networks and, particularly, but not exclusively, to triggering user re-authentication in communication networks.

BACKGROUND

Communication devices, such as cellular phones, smart phones, personal digital assistants (PDAs), laptops, and computers, provide users with a variety of communication services and networking capabilities. End users of these communication devices have access to various network services offered by a network operator in a communication network, most prominent being voice and data services. Typically, the communication network provides a communication link between the various communication devices for utilizing the network services.

The communication networks typically use pre-defined standards and protocols for providing the communication links between the communication devices. Further, with the continuous evolution and development of new standards, network services offered to an end user of the communication device have improved in terms of quality, such as better uplink and downlink speed to the end user. The end user of the communication device may thus avail network services and consequently share lot of data over the network using the communication device. The data shared over the network might be confidential and in some cases may be private and of great importance to the end user, for example, the data may include bank account details of the end user. However, with the increase in the network services offered, chances of risks to a end user by, for example, fraudulent use of the end user's communication device by a fraudulent user by way of stealing or cloning has increased.

For instance, in case the fraudulent user gets access to the end user's communication device, the fraudulent user may use the network services, such as web access, phone calls, and messaging activated on the communication device. Use of such network services may result not only in monetary loss to the end user of a network operator but also to security threat. Further, the fraudulent user may cause security threat to the end user as the fraudulent user may either access various online websites to which the end user may have logged in on the communication device or use the communication devices for antisocial activities, such as making unsolicited calls.

In a conventional technique of preventing such fraudulent uses the communication devices are re-authenticated after a predetermined interval of time to verify authenticity of the communication device. Re-authenticating the communication device thus facilitates in preventing the fraudulent user from accessing the network services offered by the network operator. However, using such a periodic re-authentication of the communication devices may not prevent an unauthorized access as the fraudulent user may avail the network services to a large extent in the interval between two re-authentications. For instance, where the predetermined interval is large the fraudulent user may download a large volume of data without requiring any authentication, resulting in huge risks to the end user.

SUMMARY

This summary is provided to introduce concepts related to triggering re-authentication in communication networks. This summary is not intended to identify essential features of the claimed subject matter nor is it intended for use in determining or limiting the scope of the claimed subject matter.

In one implementation, a method for triggering re-authentication in communication networks is described. The method includes measuring a volume of data transferred between a communication device and a communication network. Further, a comparison is done with a predefined re-authentication threshold value, as predefined by a network operator. Based on the comparison, a re-authentication of the communication device is triggered.

In another implementation, a radio network controller (RNC) for triggering re-authentication in communication networks is described. The RNC includes a processor and a data measurement module coupled to the processor. The data measurement module configured to measure a volume of data transferred between a communication device and a communication network. The RNC further includes a data comparison module coupled to the processor. The data comparison module configured to compare the volume of data transferred with a re-authentication threshold value. The comparison module is further configured to trigger re-authentication of the communication device.

In accordance with another implementation of the present subject matter, a computer-readable medium having embodied thereon a computer program for executing a method of re-authenticating a communication device connected to a communication network is disclosed. The method comprises measuring a volume of data transferred between a communication device and a communication network. The method further comprises comparing the measured volume with a preset re-authentication threshold value. Further, the method triggers re-authentication of the communication device based on the comparison.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
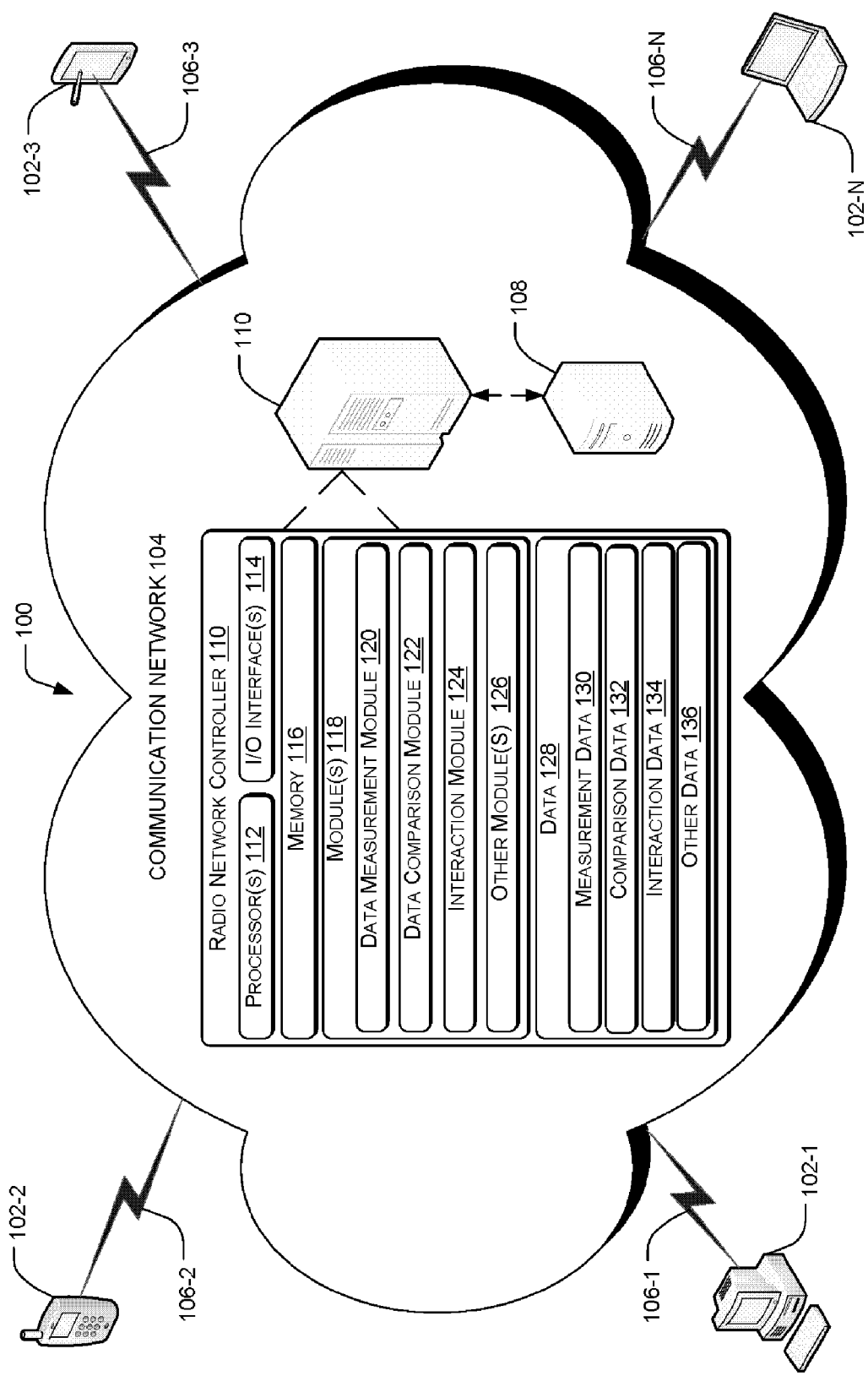
FIG. 1 illustrates an exemplary network environment implementation for triggering re-authentication of a communication device, according to an embodiment of the present subject matter.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The present subject matter relates to user re-authentication in communication networks. The methods can be implemented in various communication devices communicating through various networks. The communication devices that can implement the described method(s) include, but are not limited to cellular phones, smart phones, personal digital assistants (PDAs), portable computers, desktop computers, wireless data cards, servers, and the like. The communication networks in which the described method(s) can be implemented include, but are not limited to, Code Division Multiple Access (CDMA) implementing Evolution-Data Optimized or Evolution-Data Only (EVDO), Global System for Mobile Communication (GSM) network, Universal Mobile Telecommunications System (UMTS) network, Wideband Code Division Multiple Access (W-CDMA) network, and the like. Although the description herein is with reference to EVDO systems, the methods and systems may be implemented in other communicating networks providing data services, albeit with a few variations, as will be understood by a person skilled in the art.

Conventional techniques of authentication typically require the communication network to authenticate the communication device at the beginning of a session, i.e., when the communication device initially registers with the communication network after, for example, being switched ON or entering a network from an out-of-network mode. After a valid authentication of the communication device by the communication network, the end user of the communication device gets access to the network services offered by the network operator over the communication network.

Subsequent re-authentication of the communication device may thus be done when the communication device tries to re-establish the session on being logged out of a previous session due to, for example, being switched off or getting logged out of the network. Re-authenticating the communication device only at the time of establishing the session may however, not be able to prevent fraudulent uses of the network services in cases where the communication device is fraudulently used without terminating a previous session. For instance, a fraudulent user may, by way of theft, get access to the communication device which is already in a session and may use the communication device without terminating the session.

Another conventional technique involves re-authenticating the communication devices in the communication network based on periodical triggers. The communication network initially authenticates the communication device at the beginning of the session to allow the communication device to avail the network services. Subsequently, the communication network initiates the re-authentication mechanism after a certain predetermined interval of time to detect and block any fraudulent user from accessing the network services. However, the fraudulent user using the communication device may misuse the resources of the communication network by utilizing the network services within this interval of time. Further, in situations where the predetermined interval of time is large, the end user may incur a loss due to the unauthorized use of the network services by the fraudulent user for a long time. For instance, the end user may incur a loss as the fraudulent user of the communication device will have access to the network services for the entire interval of time till the next periodic re-authentication occurs. The network operator may charge the end user for the services availed by the fraudulent user till the access to the network services is blocked. The end user may also suffer additional loss as the fraudulent user has access to the personal data of the end user.

For example, a communication device, say a mobile handset, gets stolen. The fraudulent user of the stolen handset may have access to the various data services, such as internet access, email services, access to web, short-messaging-service (SMS), multimedia messaging service (MMS), till the time the next re-authentication occurs after the predetermined interval of time. Upon unsuccessful re-authentication of the stolen handset, the network operator may block the stolen handset's access to the network services thereby denying the fraudulent user the access to the network services. Thus, a communication network implementing the present periodic re-authentication mechanism may result in losses to the end user due to misuse of the network services availed by the fraudulent user.

The present subject matter relates to user re-authentication in communication networks. In an embodiment of the present subject matter, methods and systems for re-authentication of a communication device is described. The present systems and methods for re-authentication of the communication device involve triggering a re-authentication check based on volume of data accessed by the communication device. Triggering the re-authentication check based on the volume of data prevents a fraudulent user from extensively using the communication device, thus reducing the losses incurred by the end user and the network operator.

According to an embodiment of the subject matter, a volume of data transferred between the communication device and the communication network in the uplink and downlink channel is measured every few seconds. In one implementation, the volume of data transferred is measured from a previous authentication point, i.e., from last occurrence of re-authentication to prevent any false triggering of re-authentication as a genuine user may use a large volume of data over a long period of time but a fraudulent user may use the large volume of data even in a smaller period. The volume of data thus measured is subsequently analyzed to determine whether the re-authentication needs to be triggered.

In one implementation, the analysis is performed by comparing the volume of data with a preset threshold for triggering re-authentication, hereinafter referred to as re-authentication threshold value. For the purpose, the re-authentication threshold value, say D kbytes, is initially determined by the network operator for triggering re-authentication. As soon as the volume of data transferred between the communication device and the communication network, either in the uplink or the downlink channel reaches the re-authentication threshold value of D kbytes, the re-authentication of the communication device is triggered by the communication network, for example, by sending a re-authentication trigger.

On receiving the re-authentication trigger, the communication network may request the communication device to provide authentication data having identity credentials corresponding to the communication device. The communication network subsequently uses the authentication data of the communication device to authenticate the communication device. The re-authentication, in one implementation, involves validating authenticity of the communication device based on an equipment credentials database, such as an authentication, authorization, and accounting (AAA) module provided in the communication network. The equipment credentials database typically includes a list of the equipment identity credentials and the end user details corresponding to each of the communication devices registered with the network operator of the communication network. The communication network thus compares the authentication data of the communication device with the equipment identity credentials to identify fraudulent users. In case the communication device is successfully authenticated, the user is granted access to network services. In case the communication device is blacklisted or blocked in the communication network database, it fails the re-authentication procedure and the access to the network services is blocked.

After the re-authentication is triggered, counters for measuring the volume of data transfer on both the uplink channel and the downlink channel are reset. The volume of data transferred between the communication device and the communication network is measured again for facilitating re-authentication based on the volume of data transferred.

The present subject matter thus enables re-authentication of the communication device by measuring the volume of data transferred between the communication device and the communication network. Further, implementing the present subject matter facilitates reduction in losses as the fraudulent user may be blocked sooner as compared to a periodic timer based system.

The described methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "system" encompasses logic implemented by software, hardware, firmware, or a combination thereof.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit. Memory can be implemented within the processing unit or may be external to the processing unit. As used herein the term "memory" refers to any type of long term, short term, volatile, nonvolatile, or other storage devices and is not to be limited to any particular type of memory or number of memories, or type of media upon which memory is stored.

In another firmware and/or software implementation, the functions may be stored as one or more instructions or code on a computer-readable medium. Examples include computer-readable media encoded with a data structure, and the computer-readable media encoded with a computer program. The computer-readable media may take the form of an article of manufacturer. The computer-readable media includes physical computer storage media. A storage medium may be any available medium that can be accessed by a computer. By way of example, and not limitation, such a computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of the computer-readable media.

In addition to storage on the computer readable media, instructions and/or data may be provided as signals on transmission media included in a communication apparatus. For example, a communication apparatus may include a transceiver having signals indicative of instructions and data. The instructions and the data are configured to cause one or more processors to implement the functions outlined in the claims. That is, a system includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Further, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

Figure 2:
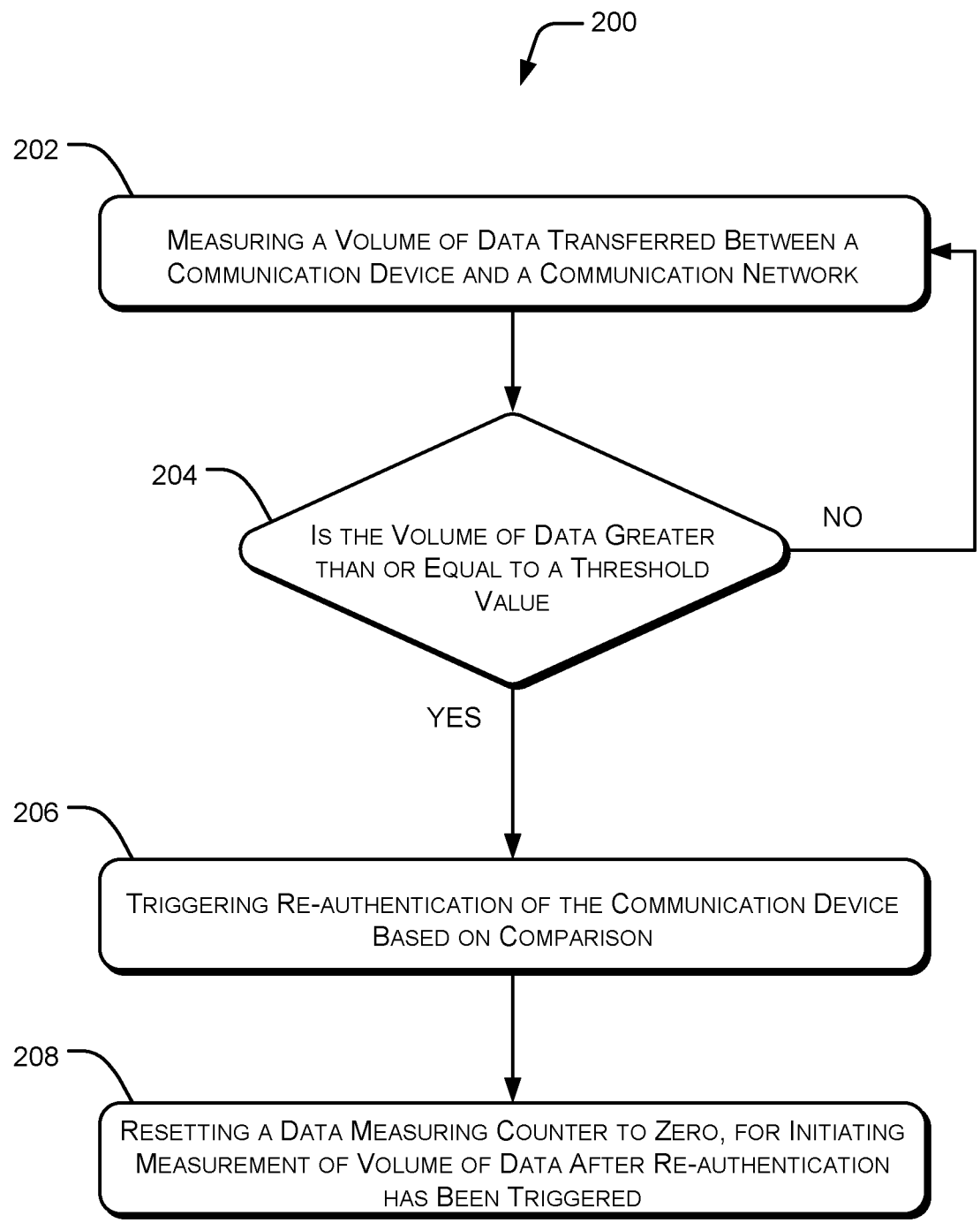
FIG. 2 illustrates a method for triggering re-authentication of the communication device, in accordance with an embodiment of the present subject matter.

The manner in which the systems and the methods of triggering re-authentication in communication networks shall be implemented has been explained in details with respect to the FIGS. 1 and 2. While aspects of described systems and methods for triggering re-authentication in communication networks can be implemented in any number of different computing systems, transmission environments, and/or configurations, the embodiments are described in the context of the following exemplary system(s).

FIG. 1 illustrates a network environment 100 for facilitating re-authentication of one or more communication devices 102-1, 102-2, . . . , and 102-N, collectively referred to as communication devices 102 and individually referred to as communication device 102 hereinafter, connected to a communication network 104, according to an embodiment of the present subject matter.

The communication devices 102 may be defined as User Equipments (UEs) used by users to communicate with each other. Examples of the communication devices 102 may include, without limitation, mobile phones, landline phones, desktop computers, hand-held devices, laptops or other portable computers, network computers, and the like. Each of the communication devices 102 work on a communication protocol as defined by the communication network to which the communication device 102 is coupled.

The communication network 104 may be a wireless network, or a combination of wired and wireless network. The communication network 104 can be a collection of individual networks, interconnected with each other and functioning as a single large network (e.g., the internet or an intranet). Examples of such individual networks include, but are not limited to, 3rd Generation Partnership Project (3GPP), Long Term Evolution (LTE), and the like. Although the description herein is with reference to Code Division Multiple Access (CDMA) network implementing Evolution-Data Optimized or Evolution-Data Only (EVDO) standard, the methods and the systems may be implemented in other communicating networks involving scheduled uplink transmissions, albeit with a few variations, as will be understood by a person skilled in the art. Further, depending on the technology, the communication network 104 includes various network entities, such as gateways, routers; however, such details have been omitted for ease of understanding.

Further, the communication devices 102 are configured to interact with each other over the communication network 104 using network routed communication links 106-1, 106-2, 106-3, . . . , 106-n, hereinafter collectively referred to as the network routed communication links 106. The network routed communication links 106 may be understood as communication links used in conventional communication where the communication devices 102 interact with each other or the communication network 104 through network resources.

The communication network 104 further comprises an authentication, authorization, and accounting (AAA) server 108 and a radio network controller (RNC) 110. The AAA server 108 is configured to authorize the communication devices 102 associated with a network operator of the communication network 104. In one implementation, the AAA server 108 acts as an equipment credentials database and includes a list of the equipment identity credentials of the communication devices 102, used for authentication of the communication devices 102 connected to the communication network 104. Further, the AAA server 108 contains subscriber details, i.e., details of end users corresponding to the communication devices 102 subscribed to services provided by the network operator over the communication network 104.

The RNC 110 is configured to trigger re-authentication of the communication devices 102 connected to the communication network 104. In one implementation the RNC 110 is configured to trigger the AAA server 108 to perform authentication and re-authentications of the communication device 102 based on the volume of data used by the communication device 102. For the purpose, the RNC 110 includes one or more processor(s) 112, I/O interface(s) 114, and a memory 116 coupled to the processor 112. The processor(s) 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 112 are configured to fetch and execute computer-readable instructions stored in the memory 116.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The I/O interface(s) 114 may include a variety of software and hardware interfaces, for example, interfaces for peripheral device(s), such as data input output devices, referred to as I/O devices, storage devices, network devices, etc. The I/O device(s) may include Universal Serial Bus (USB) ports, Ethernet ports, host bus adaptors, etc., and their corresponding device drivers. The I/O interface(s) 114 facilitate the communication of the radio network controller 110 with various networks, such as the communication network 104 and various communication and computing devices, such as the communication devices 102.

The memory 116 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The RNC 110 may also include various modules 118. The modules 118, amongst other things, include routines, programs, objects, components, data structures, etc., which perform particular tasks or implement particular abstract data types. The modules 118 may also be implemented as, signal processor(s), state machine(s), logic circuitries, and/or any other device or component that manipulate signals based on operational instructions.

Further, the modules 118 can be implemented in hardware, instructions executed by a processing unit, or by a combination thereof. The processing unit can comprise a computer, a processor, such as the processor 112, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 118 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The module(s) 118 further include a data measurement module 120, a data comparison module 122, an interaction module 124, and other module(s) 126. The other module(s)

126 may include programs or coded instructions that supplement applications and functions of the RNC 110.

The RNC 110 may further include data 128, which amongst other things, serves as a repository for storing data processed, received, associated, and generated by one or more of the module(s) 118. The data 128 includes, for example, measurement data 130, comparison data 132, interaction data 134, and other data 136. The other data 136 includes data generated as a result of the execution of one or more modules in the other module(s) 126.

As previously described, the RNC 110 is configured to trigger re-authentication of the communication device 102 connected to the communication network 104 based on the volume of the data transferred between the communication device 102 and the communication network 104. Triggering the re-authentication based on the volume of data facilitates in preventing fraudulent users from using the services of the network operator subscribed on the communication devices 102. For instance, when a communication device is lost or stolen, the end user of the communication device may typically lodge a complaint to the network operator, requesting the network operator to block services to the communication device. The network operator upon receiving the end user's complaint updates an equipment credentials database to blacklist or block the communication device. Blacklisting the communication device in the equipment credentials database ensures that the services to the communication device may be blocked whenever a re-authentication of the communication device is performed by the communication network. For instance, when the communication device 102-1 gets stolen, the end user of the communication device 102-1 may lodge a complaint with the network operator. Based on the complaint, the network operator may update the AAA server 108 to blacklist or block the communication device 102-1. The AAA server 108 may thus block the service provided to the communication device 102-1 upon failure of re-authentication.

In one implementation, the RNC 110 may be configured to trigger re-authentication of the communication device 102 based on the volume of data transferred between the communication device 102 and the communication network 104. For the purpose, the data measurement module 120 may be configured to measure the volume of data transferred between the communication device 102 and the communication network 104. In one implementation, the data measurement module 120 may be configured to measure the volume of data in an uplink channel. In another implementation, the data measurement module 120 may be configured to measure the volume of data in a downlink channel. Further, in another implementation, the data measurement module may be configured to measure the volume of data in both the uplink channel and the downlink channel. In one implementation, the data measurement module 120 may be configured to measure the volume of data after every few seconds. For example, the data measurement module 120 may be configured to measure the volume of data in at least one of the uplink channel and the downlink channel every 2 seconds. Measuring the volume of data every few seconds facilitates in avoidance of performance restrictions on the access of the communication network 104 that may be imposed in case of a continuous monitoring of the volume of data. In another implementation, the data measurement module 120 may be configured to continuously measure the volume of data, for example, in high security alert situations to avoid unauthorized use of the network services.

Further, the data measurement module 120 may be configured to measure the volume of data from a previous authentication point, i.e., from last occurrence of re-authentication, as measuring the volume of data from the first time the communication device 102 registered with the communication network 104 may cause a false triggering of the re-authentication. The measured volume of data may be further stored in the measurement data 130 by the data measurement module 120.

The measured volume of data may be further accessed by the data comparison module 122 to determine whether a re-authentication of the communication device 102-1 needs to be triggered or not. In one implementation, the comparison module 122 is configured to compare the volume of data with a preset threshold for triggering re-authentication value, hereinafter referred to as the re-authentication threshold value. For the purpose, the comparison module 122 may obtain the re-authentication threshold value stored in the comparison data 132. In one implementation, the re-authentication threshold value may be predefined by the network operator of the communication network 104. The network operator may predefine the re-authentication threshold value based upon the level of security desired in the communication network 104. Setting a low re-authentication threshold value might result in frequent re-authentication of the communication device 102, whereas a high re-authentication threshold value may prolong the time period between two consequent re-authentications. For example, the network operator may define the re-authentication threshold value of D Mb for triggering re-authentication. The data comparison module 122 may thus compare the volume of data with the re-authentication threshold value of D Mb to determine whether the volume of data transferred between the communication device 102 and the communication network 104 has reached the re-authentication threshold value. In one implementation, the data comparison module 122 may compare the data transferred over at least one of the uplink channel and the downlink channel o determine whether the volume of data transferred over either of these channels reaches the re-authentication threshold value of D Mb. In another implementation, the data comparison module 122 may compare the combined data transferred over the uplink channel and the downlink channel to determine whether the total volume of data transferred over at least one of these channels has reached the re-authentication threshold value of D Mb.

In case the data comparison module 122 determines that the volume of data has reached the re-authentication threshold value, the data comparison module 122 may generate a re-authentication trigger. Otherwise, the data comparison module 122 may indicate the data measurement module 120 to keep measuring the volume of data. For instance, when the communication device 102-1 is stolen, a fraudulent user of the communication device 102-1 may use the services, such as internet access, messaging, and voice calls activated on the communication devices 102-1 to its maximum use, thus increasing the volume of data transferred between the communication device 102-1 and the communication network 104. The data comparison module 122 in such a case may compare the volume of data corresponding to communication device 102-1 to determine that it has reached the re-authentication threshold value and thus needs to be re-authenticated to ascertain if the communication device 102 is being used by a fraudulent user.

For example, if a network operator predefines a threshold value say 50 Mb, and the volume of data transferred over either the uplink channel or the downlink link channel is less than 50 Mb, the re-authentication will not be required. However, if the volume of data transferred over either the uplink channel or the downlink link channel is greater than or equal to 50 Mb, the re-authentication will be required. The data comparison module 122 may thus generate the re-authentication trigger. In one implementation, the re-authentication trigger may be a message asking the interaction module 124 to initiate an authentication process. In another implementation, the re-authentication trigger can be a re-authentication alert indicating the interaction module 124 to initiate the authentication process.

On receiving the re-authentication trigger, the interaction module 124 may request the communication device 102 to provide authentication data having identity credentials corresponding to the communication device 102. Upon receiving the request for authentication data, the communication device 102 provides the authentication data to the interaction module 124. In one implementation, the interaction module 124 may request for the authentication data using a challenge handshake authentication protocol (CHAP) challenge message. The communication device 102 in response sends a CHAP response back to the interaction module 124. On receiving the CHAP response message the interaction module 124 saves the CHAP response message in the interaction data 134. The interaction module 124 further sends an access-request message to the AAA server 108 asking the AAA server 108 to authenticate the communication device 102. The AAA server 108 subsequently compares the authentication data of the communication device 102 with the equipment identity credentials stored in the AAA server 108. In case the communication device 102 is blacklisted or blocked in the AAA server 108, it fails the re-authentication procedure and the access to the network services is blocked. The AAA server 108 in such a case may send an access rejection message to the RNC 110 for indicating to the communication device 102 that its services have been blocked. If the communication device 102 passes the authentication, the AAA server 108 sends an access accept message to the RNC 110.

Further, the data measurement module 120 resets a data measurement counter, used for measuring the volume of data transferred between the communication device 102 and the communication network 104, to an initial value, say zero after the re-authentication has been triggered. The data measurement module 120 may subsequently start measuring the data from beginning for all the communication devices 102 that have passed the re-authentication.

The present subject matter thus enables triggering re-authentication of the communication device 102 based on the volume of data transferred between the communication device 102 and the communication network 104, thus reducing the monetary losses caused due to fraudulent use of the communication device 102. For instance, a fraudulent user availing network services will be authenticated based on the volume of data transferred and will be blocked and denied access to the network services.

FIG. 2 illustrates a method 200 for triggering re-authentication of a communication device, such as the communication device 102, in accordance with an embodiment of the present subject matter. Herein, some embodiments are also intended to cover program storage devices, for example, digital data storage media, which are machine or computer readable and encode machine-executable or computer-executable programs of instructions, wherein said instructions perform some or all of the steps of the described method. Further, the computer-executable programs are being loadable into a data-processing unit. The program storage devices may be, for example, digital memories, magnetic storage media, such as magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 202, a volume of data transferred between a communication device and a communication network is measured. In one implementation, the volume of data transferred over an uplink channel and a downlink channel between the communication device and the communication network is measured after every few seconds. A data measurement module, for example, the data measurement module 120 may be configured to measure the volume of data transferred between the communication device 102 and the communication network 104.

At block 204, a comparison is made between the measured volume of data and a re-authentication threshold value, predefined by a network operator. In one implementation, the volume of data is compared with the re-authentication threshold value to ascertain whether the measured volume of data is equal to or greater than the re-authentication threshold value. A data comparison module, for example, the data comparison module 122 may be configured to compare the measured volume of data with the threshold value. If the measured volume of data is less than the threshold value, which is the 'NO' path from the block 204, the method proceeds to block 202. In case if the measured volume of data is equal to or greater than the threshold value, which is the 'YES' path from the block 204, the method proceeds to block 206.

At block 206, a re-authentication of the communication device is triggered based on the comparison. In one implementation, a re-authentication trigger may be generated in case where the volume of data reaches the re-authentication threshold value. Based on the re-authentication trigger, the communication device may be asked to provide authentication data having identity credentials corresponding to the communication device. The authentication data of the communication device may be subsequently used to authenticate the communication device. The re-authentication, in one implementation, involves validating authenticity of the communication device based on an equipment credentials database provided in the communication network. The equipment credentials database typically includes a list of the equipment identity credentials and the end user details corresponding to each of the communication devices registered with the network operator of the communication network. The authentication data of the communication device may thus be compared with the equipment identity credentials to identify fraudulent users.

In case the communication device is blacklisted or blocked in the communication network database, the communication device fails the re-authentication procedure and the communication device's access to the network services may be blocked. On passing the re-authentication the communication device's access to network services may be continued. In one implementation, a data comparison module, for example, the data comparison module 122 generates the re-authentication trigger for initiating re-authentication of the communication device 102.

At block 208, a data measuring counter is reset to zero after re-authentication has been triggered. For example, the data measurement module 120 may reset the data measurement counter to zero after the re-authentication of the communication device 102 has been triggered so that a next cycle of re-authentication begins from zero Mb thus avoiding any false trigger.

Although embodiments for methods and systems for triggering user re-authentication in a communication network have been described in a language specific to structural features and/or methods, it is to be understood that the invention is not necessarily limited to the specific features or methods described. Rather, the specific features and methods are disclosed as exemplary embodiments for triggering user authentication in a communication network.

The invention claimed is:

1. A method comprising the steps of:
    storing, at a radio network controller connected to an externally located authentication, authorization, and accounting (AAA) server, a re-authentication threshold value for a user's communication device, the re-authentication threshold value being a preset threshold value for data;
    measuring, at the radio network controller, a volume of data transferred between the user's communication device and a communication network, wherein the measuring of the volume of the data is performed in both an uplink channel and a downlink channel;
    comparing, at the radio network controller, the transferred volume of the data with the stored re-authentication threshold value;
    triggering, at the radio network controller, the AAA server to re-authenticate the user's communication device on a condition that the transferred volume of the data is greater than or equal to the stored re-authentication threshold value; and
    determining, at the radio network controller, whether the user's communication device is blacklisted based on authentication data from the user's communication device, wherein the authentication data comprises identity credentials that correspond to the user's communication device.

2. The method of claim 1, further comprising the step of obtaining, at the radio network controller, the re-authentication threshold value determined by a network operator of the communication network.

3. The method of claim 1, wherein the step of measuring further comprises determining, at the radio network controller, the volume of the data transferred between the user's communication device and the communication network over at least one of the uplink channel and the downlink channel every two seconds.

4. The method of claim 1, further comprising the steps of:
    requesting, at the radio network controller, the authentication data from the user's communication device;
    receiving, at the radio network controller, the authentication data from the user's communication device; and
    providing, at the radio network controller, the authentication data to the AAA server of the communication network.

5. The method of claim 4, further comprising the steps of:
    analyzing, at the radio network controller, the identity credentials corresponding to the user's communication device and equipment identity credentials corresponding to the user's communication device saved in the AAA server of the communication network;
    determining, at the radio network controller, if the user's communication device is blacklisted based on the analysis; and
    blocking, at the radio network controller, the user's communication device from accessing services provided by a network operator of the communication network on a condition that the user's communication device is blacklisted.

6. The method of claim 1, wherein the measuring is performed from a previous authentication point.

7. The method of claim 1, wherein the measuring is performed continuously.

8. The method of claim 1, further comprising resetting, at the radio network controller, counters for measuring the volume of the data transferred on both the uplink channel and the downlink channel to an initial value after a re-authentication has been triggered.

9. The method of claim 1, wherein a time period between two consequent re-authentications depends upon the re-authentication threshold value.

10. The method of claim 1, further comprising triggering, at the radio network controller, the AAA server to re-authenticate the user's communication device via a message.

11. The method of claim 1, wherein the volume of the data transferred is measured from a last occurrence of a re-authentication.

12. The method of claim 1, further comprising triggering, at the radio network controller, the AAA server to re-authenticate the user's communication device via a re-authentication alert.

13. The method of claim 1, wherein the communication network is a Universal Mobile Telecommunications System (UMTS) network or an Evolution-Data Optimized or Evolution-Data Only (EVDO) network.

14. A radio network controller comprising:
    one or more processor components;
    one or more input-output (I/O) interfaces to facilitate communications, at least one of the one or more I/O interfaces being configured to connect the radio network controller to an externally located authentication, authorization, and accounting (AAA) server; and
    a non-transitory computer readable storage device with computer executable instructions stored thereon that, when executed by the one or more processor components, causes the one or more processor components to:
    store a re-authentication threshold value;
    measure a volume of data transferred between a user's communication device and a communication network, wherein the measure of the volume of the data is performed in both an uplink channel and a downlink channel;
    compare the transferred volume of the data with the stored re-authentication threshold value for the user's communication device, the stored re-authentication threshold value being a preset threshold value for data;
    trigger, via the at least one of the one or more I/O interfaces, the AAA server to re-authenticate the user's communication device on a condition that the transferred volume of the data is greater than or equal to the stored re-authentication threshold value; and
    determine whether the user's communication device is blacklisted based on authentication data from the user's communication device, wherein the authentication data comprises identity credentials that correspond to the user's communication device.

15. The radio network controller of claim 14, wherein the one or more processor components are further configured to execute the stored instructions to measure the volume of the data transferred between the user's communication device and the communication network over at least one of the uplink channel and the downlink channel every two seconds.

16. The radio network controller of claim 14, wherein the one or more processor components are further configured to execute the stored instructions to:
- receive authentication data from the user's communication device; and
- transmit the authentication data to the AAA server connected to the radio network controller for re-authentication.

17. The radio network controller of claim 16, wherein the one or more processor components are further configured to execute the stored instructions to:
- receive an access rejection message from the AAA server, wherein the access rejection message indicates that the user's communication device is blacklisted; and
- block services to the user's communication device based on the access rejection message.

18. The radio network controller of claim 14, wherein the one or more processor components are further configured to execute the stored instructions to reset a data measuring counter to zero upon triggering of the re-authentication.

19. A non-transitory computer-readable medium storing computer executable instructions for performing steps, comprising:

storing, at a radio network controller connected to an externally located authentication, authorization, and accounting (AAA) server, a re-authentication threshold value for a user's communication device, the re-authentication threshold value being a preset threshold value for data;

measuring, at the radio network controller, a volume of data transferred between the user's communication device and a communication network, wherein the measuring of the volume of the data is performed in both an uplink channel and a downlink channel;

comparing, at the radio network controller, the transferred volume of the data with the stored re-authentication threshold value;

triggering, at the radio network controller, the AAA server to re-authenticate the user's communication device on a condition that the transferred volume of the data is greater than or equal to the stored re-authentication threshold value; and determining, at the radio network controller, whether the user's communication device is blocked from accessing services based on authentication data from the user's communication device, wherein the authentication data comprises identity credentials that correspond to the user's communication device.

* * * * *